US009632297B1

(12) United States Patent
Reuss et al.

(10) Patent No.: US 9,632,297 B1
(45) Date of Patent: Apr. 25, 2017

(54) DEVICE FOR SEPARATELY MODULATING THE WAVE FRONTS OF TWO COMPONENTS OF A LIGHT BEAM AND MICROSCOPE COMPRISING THE DEVICE

(71) Applicant: Abberior Instruments GmbH, Goettingen (DE)

(72) Inventors: Matthias Reuss, Goettingen (DE); Andreas Schoenle, Goettingen (DE); Lars Kastrup, Goettingen (DE); Gerald Donnert, Goettingen (DE); Benjamin Harke, Goettigen (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 15 days.

(21) Appl. No.: 14/932,067

(22) Filed: Nov. 4, 2015

(51) Int. Cl.
*G02B 26/08* (2006.01)
*G02F 1/29* (2006.01)
*G02B 21/00* (2006.01)

(52) U.S. Cl.
CPC ..... *G02B 21/0032* (2013.01); *G02B 21/0028* (2013.01); *G02B 21/0076* (2013.01); *G02F 1/292* (2013.01)

(58) Field of Classification Search
CPC ............ G02B 21/0028; G02B 21/0032; G02B 21/0076; G02B 26/06; G02B 27/26;
(Continued)

(56) References Cited

U.S. PATENT DOCUMENTS 7,108,402 B2 * 9/2006 MacKinnon ........... G02B 26/02
359/239
8,755,116 B2 6/2014 Kastrup et al.

FOREIGN PATENT DOCUMENTS

DE 10 2007 025 688 A1 12/2008
WO 2010/133678 A1 11/2010

OTHER PUBLICATIONS

Lenz, Martin O. et al. "3-D stimulated emission depletion microscopy with programmable aberration correction", J Biophotonics 7, No. 1-2, 29-36 (2014).
(Continued)

*Primary Examiner* — Bumsuk Won
*Assistant Examiner* — Collin X Beatty
(74) *Attorney, Agent, or Firm* — Thomas | Horstemeyer, LLP (57) ABSTRACT

A device comprises two polarization-selective optical elements for separately modulating wave fronts of two components of a collimated light beam, which are transversally polarized in orthogonal directions. The two polarization-selective optical elements are first and second partial areas of one spatial light modulator (SLM) diffracting the light beam in backward direction. A mirror arranged between the first and second partial areas of the SLM reflects the light beam coming from the first partial area towards the second partial area. A wave plate arranged between the first partial area and the second partial area of the SLM rotates the polarization directions of both components of the light beam by 90°. The mirror reflects the first and second components of the light beam as parallel bundles of light rays resulting in a lateral offset between the first and second components of the light beam behind the second partial area of the SLM.

16 Claims, 5 Drawing Sheets

(58) Field of Classification Search
CPC ............ G02B 27/0905; G02B 27/2221; G02B 27/2228; G02F 1/29; G02F 1/292; G02F 1/133528; G02F 1/133536; G02F 1/0136; G02F 1/13; G02F 1/1347; G02F 1/157; G02F 2001/133538; G02F 2413/09; G03H 1/2294; G03H 1/0224; G03H 1/2645
USPC ..... 359/9, 204.3, 207.9, 246, 251, 301, 303, 359/464, 489.07, 465, 486.01; 349/61; 362/19
See application file for complete search history.

(56) References Cited

OTHER PUBLICATIONS

Muro, Mikio and Takatani, Yoshiaki "Optical rotatory-dispersion-type spatial light modulator and characteristics of the modulated light", Applied Optics, vol. 44, No. 19, 3992-3999.

* cited by examiner

DEVICE FOR SEPARATELY MODULATING THE WAVE FRONTS OFTWO COMPONENTS OF A LIGHT BEAM AND MICROSCOPE COMPRISING THE DEVICE

FIELD OF THE INVENTION

The present invention relates to a device for separately modulating the wave fronts of two components of a collimated light beam, the two components being polarized in two transversal polarization directions which are orthogonal to each other.

The collimated light beam, which may also be designated as a bundle of parallel rays, may particularly be a laser beam.

The device may particularly be used in a laser scanning microscope to prepare or form fluorescence inhibiting light used for increasing a spatial resolution of the laser scanning microscope, prior to focusing the fluorescence inhibiting light together with excitation light by means of a common objective. The device then prepares or forms the fluorescence inhibiting light, in such a way that the intensity distribution of the fluorescence inhibiting light, around the focus of the objective at which an intensity distribution of the excitation light has a maximum, has a zero point or minimum surrounded by maxima which delimit the zero point or minimum of the intensity distribution of the fluorescence inhibiting light in all three spatial directions. This is a precondition for increasing the spatial resolution of the laser scanning microscope by means of the fluorescence inhibiting light in all three spatial directions. Fluorescence light emitted by fluorophores excited by the excitation light may only come out of the area of the zero point or minimum of the intensity distribution of the fluorescence inhibiting light. Everywhere else the emission of fluorescence light is inhibited by the fluorescence inhibiting light. Particularly, the laser scanning microscope may be a so-called STED microscope in which the fluorescence inhibiting light de-excites the excited fluorophores by stimulated emission, or any other RESOLFT microscope.

BACKGROUND OF THE INVENTION

A device for separately modulating the wave fronts of two components of a collimated light beam, the components being transversally polarized in orthogonal polarization directions, is known from Lenz, Martin O. et al. "3-D stimulated emission depletion microscopy with programmable aberration correction", J. Biophotonics 7, No. 1-2, 29-36 (2014). Here, in an STED microscope, fluorescence inhibiting light is provided as a collimated light beam comprising two components of transversal polarization directions which are orthogonal to each other. The wave fronts of the two components are one after the other modulated by a spatial light modulator (SLM) used in an off-axis holography configuration, the diffracted light being separated from the zero order reflection of the surface of the spatial light modulator. At first the fluorescence inhibiting light is directed onto a first partial area of a spatial light modulator to modulate the wave fronts of the horizontally polarized first component in such a way that a donut-shaped intensity distribution of the fluorescence inhibiting light results around the focus of a following objective. The vertically polarized polarization second component remains unchanged. Both components are then rotated by 90° by double passing the fluorescence inhibiting light through a quarter wave plate oriented at 45° in an image relay arm comprising the quarter wave plate, a lens and a mirror, such that the first partial area of the spatial light modulator is imaged onto a second partial area of the spatial light modulator. By being diffracted in this second partial area, only the now horizontally polarized second component of the fluorescence inhibiting light is modulated. Particularly, it is modulated in such a way that intensity maxima of the fluorescence inhibiting light are formed which, in the direction of the optical axis of an objective focusing the fluorescence inhibiting light, are arranged both in front of and behind the focus of the objective. Together with the donut-shaped intensity distribution of the first component of the fluorescence inhibiting light, the zero point of the fluorescence inhibiting light at the focus point of the objective is thus delimited in all spatial directions. The image relay arm also ensures that both components of the fluorescence inhibiting light will be collinear despite the diffraction they experience. Prior to focusing the two components of the fluorescence inhibiting light, they are both circularly polarized by means of a further quarter wave plate. Nevertheless, they do not interfere because they have been delayed with regard to each other for more than a coherence length of the fluorescence inhibiting light by means of a light guide fiber which delays one of the two components of the first and second polarization directions with regard to the other of the two components.

The device described by Lenz et al. is not easily integrated in an existing laser scanning microscope as its dimensions are much bigger than a focus length of optics imaging the spatial light modulator. Further, the mirror is arranged in the focus point of the lens of the image relay arm so that the focused light beam impinges on the mirror in one spot only. With a high power of the fluorescence inhibiting light, this results in very high light intensities which may damage the mirror. Further, the function of the known device is very sensitive to any contaminations of the mirror in the spot of incidence of the focused light beam.

DE 10 2007 025 688 A1 discloses an optical set-up comprising an objective for projecting two optically different light components into a common projection space and an optical part which deforms passing wave fronts of the one light component such that the intensity distribution of the one light component due to interference with itself differs from the intensity distribution of the other light component in the projection space. Both the wave fronts of the other light component and the wave fronts of the one light component pass the optical part which, however, does not deform the optical wave fronts of the other light component or which may at least be phase-corrected for the other light component. The two light components may differ in their polarization. Then, the optical part has birefringent optical properties. Particularly, the optical part may be a spatial light modulator by which the form of wave fronts of an axially polarized light component may be designed to a far extent whereas it leaves the wave fronts of light of other polarization directions unchanged.

WO 2010/133678 A1 discloses a laser scanning microscope with a birefringent chromatic device for beam forming. The microscope has a light source for excitation light and fluorescence inhibiting light, the excitation light and the fluorescence inhibiting light being components of a collimated light beam differing in wavelength. The birefringent chromatic device modulates the polarization distribution over the cross-section of the light beam differently for the excitation light and the fluorescence inhibiting light such that the excitation light comprises an intensity maximum at the focus of a following objective, whereas the fluorescence inhibiting light comprises a zero point at the focus of the objective which is surrounded by intensity maxima of the fluorescence inhibiting light.

From Muro, Mikio and Takatani, Yoshiaki "Optical rotatory-dispersion-type spatial light modulator and characteristics of the modulated light", Applied Optics, Vol. 44, No. 19, 3992-3999 it is known to place a chromatic optical polarization rotator in front of a spatial light modulator operated in transmission. The polarization rotator selectively rotates one component of a linearly polarized light beam comprising two components of different wavelengths such that this first component has the first polarization direction for which the spatial light modulator is active. Thus, in an STED microscope, the fluorescence inhibiting light may selectively be modulated with regard to its wave fronts to provide a zero point at the focus of the objective which is, for example, surrounded by a ring-shaped intensity distribution of the fluorescence inhibiting light, whereas the excitation light passes the spatial light modulator without modulation of its wave fronts and is thus focused by the objective such that it has its intensity maximum at the focus point. The known device is only suited for forming an intensity distribution of the fluorescence inhibiting light which delimits the zero point of the intensity distribution of the fluorescence inhibiting light in two spatial dimensions but which does not delimit the zero point also in the third spatial direction, i.e. along the z-axis.

There still is a need of a device for separately modulating the wave fronts of two components of a collimated light beam, which have orthogonal transversal polarization directions, the device being so compact that it may be integrated in existing laser scanning microscopes to form, at a high operational reliability, an intensity distribution of fluorescence inhibiting light delimiting a zero point in the focus of an objective of the laser scanning microscope in all three spatial dimensions with intensity maxima of the fluorescence inhibiting light.

SUMMARY OF THE INVENTION

The present invention relates to a device for separately modulating wave fronts of a first component and a second component of a collimated light beam, the first component and the second component being transversally polarized in a first direction and in a second direction orthogonal to the first direction, respectively. The device comprises a first polarization-selective optical element configured to selectively modulate the wave fronts of the first component; and a second polarization-selective optical element configured to selectively modulate the wave fronts of the second component, the second polarization-selective optical element being arranged behind the first polarization-selective optical element in a beam path of the collimated light beam; wherein the first and second polarization-selective optical elements are first and second partial areas of one spatial light modulator, the first and second partial areas both diffracting the light beam in backward direction. The device further comprises at least one mirror arranged in the beam path of the light beam between the first and the second partial areas of the spatial light modulator to reflect the light beam coming from the first partial area towards the second partial area; and a wave plate configured and arranged in the beam path of the light beam between the first partial area and the second partial area of the spatial light modulator to rotate the polarization directions of both components of the light beam by 90°; wherein the at least one mirror is configured and arranged to both reflect the first component and the second component of the light beam as parallel bundles of light rays resulting in a lateral offset between the first component and the second component of the light beam in the beam path of the light beam behind the second partial area of the spatial light modulator.

The present invention also relates to a method of using the device according to the present invention for separately modulating wave fronts of a first component and a second component of a collimated light beam, the first component and the second component being transversally polarized in a first direction and in a second direction orthogonal to the first direction, respectively. The method comprises operating the spatial light modulator in its first and second spatial areas for impressing first and second modulation patters in the wave fronts of the first and second components of the light beam, respectively; and modifying at least one of the first and second modulation patterns to compensate for the lateral offset between the first component and the second component of the light beam in the beam path of the light beam behind the second partial area of the spatial light modulator.

The present invention also relates to a scanning fluorescence microscope comprising an excitation light source configured to provide excitation light; a fluorescence inhibiting light source configured to provide fluorescence inhibiting light as a first component and a second component of a collimated light beam, the first component and the second component being transversally polarized in a first direction and in a second direction orthogonal to the first direction, respectively; a common objective configured to focus both the excitation light and the fluorescence inhibiting light; and a device according to the present invention arranged in a beam path of the collimated light beam.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

In a device for separately modulating the wave fronts of two components of a collimated light beam, the two components being transversally polarized in two orthogonal polarization directions, a first polarization-selective optical element is arranged in a beam path of the collimated light beam, that selectively modulates the wave fronts of the first component. Behind the first optical element, a second polarization-selective optical element is arranged in the beam path of the collimated light beam, that selectively modulates the wave fronts of the second component. Both the first optical element and the second optical element and all optical elements arranged in the optical axis of the collimated light beam arranged between the first and the second optical element conserve the light beam as a bundle of parallel light rays. In other words, no component of the light beam is focused between the first and second polarization-selective optical elements.

In the present invention, it is accepted that the polarization-selective optical elements, upon selectively modulating the wave fronts of one of the two components of the light beam, may change the direction of this component with regard to the other component. Nevertheless, any imaging optic between the two polarization-selective optical elements enabling a correction of such a change in direction is omitted. This allows for a very compact realization of the device according to the present invention, i.e. a small distance between the first and the second polarization-selective optical element, and thus corresponding small overall dimensions of the device according to the present invention. Further, a small distance between the two polarization-selective optical elements result in that no big lateral distance between the two components of the light beam is created up to the second optical element due to the deflection of the first component with regard to the second component by means of the first optical element. If the second optical element deflects the second component with regard to the first component in the same transversal direction with regard to the optical axis, a simple lateral offset between the two components of the light beam results behind the second polarization-selective optical element. This requires that a wave plate is arranged in the beam path of the collimated light beam between the two polarization-selective optical elements, which rotates the polarization directions of both components by 90°. Due to the short optical path length between the two polarization-selective optical elements, the lateral offset remains small in the device according to the present invention.

Further, this offset between the two components of the light beam may be compensated for by modifying at least one of the modulation patterns impressed in the wave fronts of the modulated component by the first or second optical element with regard to the optical axis. This means that, in one or both of the modulation patterns, it is considered that at least one of the two components of the light beam is laterally offset with regard to the optical axis. The modulation pattern is modified accordingly to nevertheless provide the desired maxima of the intensity distribution of the fluorescence inhibiting light around the focus of a following objective, for example. The modification of the at least one modulation pattern is particularly easy, if a spatial light modulator (SLM) is used as the polarization-selective optical element. In this case, the modification only requires a modified control of the SLM.

In a particular embodiment of the device according to the present invention, the first and the second optical element are partial areas of a single SLM which diffracts the beam of light in both partial areas in backward direction. In the spatial light modulator, no use is made of the zero order reflection of the light beam off the surface of the SLM but of the first or higher order diffracted components of the light beam. Here, the deflection of the respective component modulated with regard to its wave fronts with regard to the other component of the light beam whose wave fronts are not modulated by the respective area of the SLM increases with the order of diffraction. Due to the particularly compact set-up of the device according to the present invention, however, diffractions of higher order may nevertheless be used. In order to reflect the light beam after its first diffraction at the spatial light modulator back onto the spatial light modulator, two mirrors may be arranged in series along the optical axis between the two partial areas of the SLM. In the device according to the present invention, all components of the light beam impinge on these mirrors as bundles of parallel rays of a certain cross-section and thus with a limited light intensity. For rotating the polarization direction of the two components of the light beam between the two partial areas of the SLM so that each of the two partial areas of the SLM acts upon one of the two components of the light beam, a half wave plate for the two components of the light beam may be arranged between the two mirrors.

In a particularly compact embodiment of the device according to the present invention, only one mirror is arranged on the optical axis between the two partial areas of the spatial light modulator, on which a quarter wave plate is arranged for both components of the light beam. This quarter wave plate is passed by both components of the light beam for a first time on their way from the SLM to the mirror and for a second time on their way back from the mirror to the SLM so that the polarization directions of both components of the light beam are rotated by a total of 90°.

The single mirror may be formed as a reflective coating of a partial area of a transparent substrate. The quarter wave plate will then be arranged at or on the substrate in this partial area of the substrate. In front of the first and/or behind the second partial area of the SLM, the beam path of the light beam may extend through uncoated areas of the transparent substrate. The substrate may thus be arranged at a short distance in front of the spatial light modulator and nevertheless be easily mounted in a defined way. Due to the realization of the two polarization-selective optical elements as partial areas of a single SLM, the resulting small lateral distance between the two polarization-selective optical elements is no problem in contrast to a case in which two separate spatial light modulators would be used for separately modulating the first and second components of the light beam.

If the wave plate arranged in the beam path between the two partial areas of the SLM is chromatic to such an extent that it is not effective for a further component of the light beam which has the same initial transversal polarization direction as the second component of the light beam but another wavelength than both the first and second components of the light beam, the wave fronts of this further component are not modulated by the device according to the present invention at all. Thus, in a scanning fluorescence microscope comprising the device according to the present invention, the excitation light may be passed through the device according to the present invention as this third component of the light beam together with the fluorescence inhibiting light as the first and second component of the light beam, and the wave fronts of the excitation light will remain untouched so that the focused excitation light has the desired maximum at the focus of the objective of the microscope.

In the device according to the present invention, the optical path length between the first and second optical element along the optical axis or beam path of the beam of light may particularly be restricted to not more than 15 cm, preferably to not more than 2 cm.

In a further device according to this disclosure, a particularly short optical path length results as the first and second polarization-selective optical elements are transmissive polarization-selective optical elements directly arranged one behind the other. If these two optical elements are fixed, i.e. rigidly connected to each other, there is a fixed spatial relation between the two modulation patterns impressed by them in the wave fronts of the two components of the light beam.

Between the first and the second transmissive optical element, a chromatic wave plate may be arranged in the optical axis. If this wave plate is either effective for a further component of the light beam which has the same transversal polarization direction as the second component but another wavelength and not effective for the first and the second component of the light beam, or effective for the first component and the second component of the light beam but not effective for a further component of the light beam which has the same transversal polarization direction as the second component but another wavelength, the further component of the light beam will pass through the device without its wave fronts being modulated as, in both cases, it has the polarization direction which results in no modulation of the wave fronts by the respective optical element when passing through the first and second optical elements.

In the device according to the present invention, the wave fronts may, for example, be corrected for phase errors depending on the polarization direction of the light beam to provide exactly plane wave fronts. This is also an aspect of the separate modulation of the wave fronts of two components polarized in two orthogonal transversal polarization directions of a collimated light beam according to the present disclosure.

A scanning fluorescence microscope according to the present invention, besides an excitation light source for excitation light, a fluorescence inhibiting light source for fluorescence inhibiting light, a common objective for focusing the excitation light and the fluorescence inhibiting light as well as the further usual components of a scanning fluorescence microscope, like for example a detector for the fluorescence light emitted out of the sample to be examined, comprises a device according to the present invention in the beam path of the fluorescence inhibiting light. The fluorescence inhibiting light comprises the first and second components of the light beam whose wave fronts are separately modulated by the device according to the present invention.

If the device according to the present invention comprises said chromatic wave plate between the first and second polarization-selective optical element, the device according to the present invention may also be arranged in the beam path of the excitation light in the scanning fluorescence microscope according to the present invention. In this case, the excitation light is the further component of the light beam which differs from the first and second component with regard to its wavelength and which has the polarization direction of the second component and whose wave fronts remain unmodulated by the device according to the present invention.

In the scanning fluorescence microscope according to the present invention, a birefringent optical device may be arranged in the beam path of the fluorescence inhibiting light in front of the device according to the present invention. This birefringent optical device may delay the one of the first and second components of the light beam with regard to the other of the first and second components of the optical light beam by more than a coherence length of the fluorescence inhibiting light. Then, the two components of the fluorescence inhibiting light are no longer coherent, i.e. able to interfere with each other. They may thus be superimposed without interaction in a focus of an objective, even if their polarization directions are both changed to circular polarization directions by a quarter wave plate in front of the objective.

Figure 1:
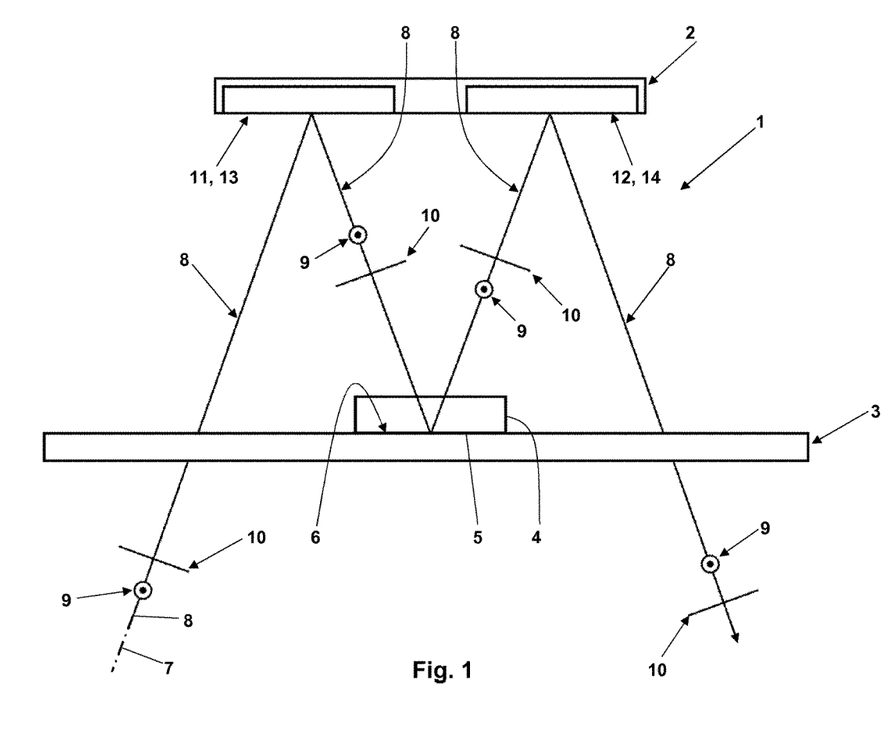
FIG. 1, in a schematic drawing, shows a first embodiment of a device for separately modulating the wave fronts of two components of a collimated light beam, the two components being transversally polarized in two orthogonal directions.

Referring now in greater detail to the drawings, the device 1 according to the present invention depicted in FIG. 1 has a spatial light modulator (SLM) 2 and a glass substrate 3 arranged in front of the spatial light modulator 2. A quarter wave plate 4 is arranged on top of a partial area of the glass substrate 3 facing the SLM. The surface of the quarter wave plate 4 facing the glass substrate 3 is coated with a reflective coating 5 to provide a mirror 6. Alternatively, the glass substrate 3 is coated with the reflective coating 5 in the partial area covered by the quarter wave plate 4 to provide the mirror 6. The device 1 acts upon a light beam 8 incident along a beam path 7, which comprises two components transversally polarized in two orthogonal polarization directions 9 and 10 which are represented in FIG. 1 by direction symbols. The light beam 8 first passes through the glass substrate 3 outside the mirror 6. This results in a small lateral offset of the entire light beam 8 with regard to the original beam path, which is not depicted here. Then, the light beam 8 impinges on a first partial area 11 of the spatial light modulator 2. The polarization directions 9 and 10 are oriented with regard to an active direction of the spatial light modulator 2 in such a way that the polarization direction 9 of the one component of the light beam 8 corresponds to this active or first direction of the spatial light modulator 2, whereas the polarization direction 10 of the other component of the light beam 8 corresponds to the inactive or second direction of the spatial light modulator 2. The light beam 8 diffracted backwards by the spatial light modulator 2 thus comprises a modulation of the wave fronts of the one component of the light beam 8 having the polarization direction 9 depending on the actual control of the spatial light modulator 2 in the partial area 11. The other component of the light beam 8 having the polarization direction 10, however, is not modulated with regard to its wave fronts by the first partial area 11 of the spatial light modulator 2. Next, the light beam 8 is reflected by the mirror 6 onto a second partial area 12 of the spatial light modulator 2. On its way to and from the mirror 6 the light beam 8 twice passes through the quarter wave plate 4 so that the polarization directions of both components of the light beam 8 are rotated by 90°. As a consequence, the component of the light beam 8 whose wave fronts have been modulated by the partial area 11 of the spatial light modulator 2 now has the polarization direction 10, whereas the component with the not yet modulated wave fronts has the polarization direction 9. Consequently, the partial area 12, depending on the control of the spatial light modulator 2, now modulates the wave fronts of the second component of the light beam 8, as its polarization direction 9 coincides with the first polarization direction of the spatial light modulator 2. Thus, the two components of the light beam 8 passing through the glass substrate 3 in another area outside the mirror 6 have separately modulated wave fronts, i.e. the component having the polarization direction 10 has wave fronts modulated by the partial area 11, and the component having the polarization direction 9 has wave fronts modulated by the partial area 12 of the spatial light modulator 2. The set-up of the device 1 may be very compact. The distance between the spatial light modulator 2 and the glass substrate 3 may be shorter than 1 cm. With such a short distance, it is advantageous that both optical elements which separately modulate the wave fronts of one component of the light beam 8 are partial areas 11 and 12 of a single spatial light modulator 2 and no separate optical elements or even separate spatial light modulators arranged side by side. With the short distance between the mirror 6 and the spatial light modulator 2, the realization of the mirror 6 at the surface of the glass substrate 3 is also advantageous as it allows for arranging the mirror 6 and the quarter wave plate 4 locally and at a short distance in front of the spatial light modulator 2 but nevertheless in a mechanically defined way.

Figure 2:
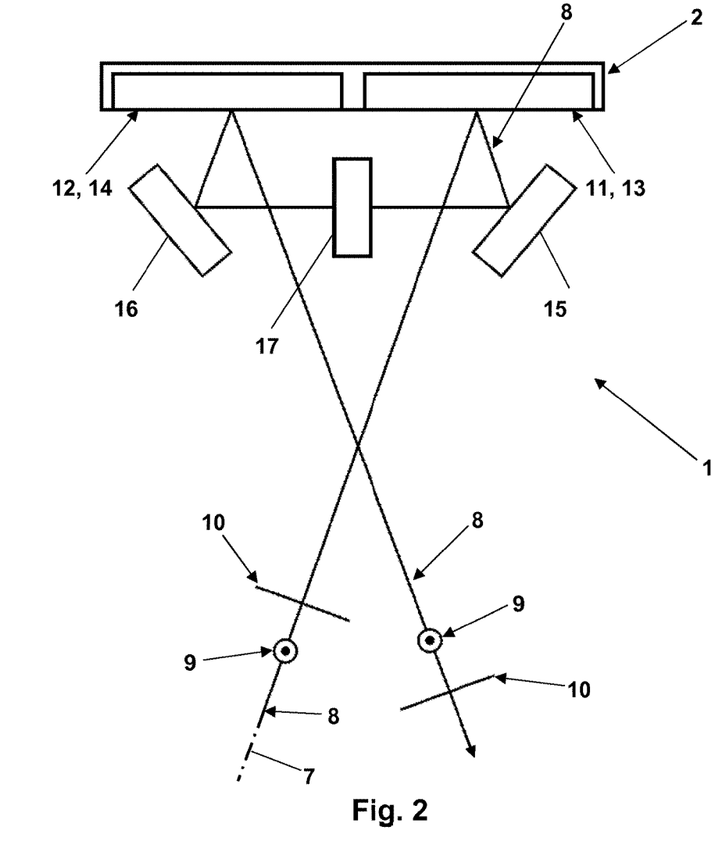
FIG. 2, in a schematic drawing, shows a second embodiment of the device.

The embodiment of the device 1 depicted in FIG. 2 also has a spatial light modulator 2 including to partial areas 11 and 12 which are used at optical elements 13 and 14 each modulating the wave fronts of one component of the light beam 8 incident along the optical axis 7. Here, the light beam 8 diffracted backwards by the first partial area 11 is reflected onto the partial area 12 of the spatial light modulator 2 by means of two mirrors 15 and 16. The mirrors 15 and 16 may particularly be made as D-mirrors so that they do not collide with the light beam 8 when entering the device 1 or exiting the device 1. Between the mirrors 15 and 16, the light beam 8 passes through a half wave plate 17 which, in one step, rotates the polarization directions 9 and 10 of the two components of the light beam 8 by 90° and thus interchanges them with regard to the first polarization direction of the spatial light modulator 2. Thus, the second partial area 12 once again acts upon the wave fronts of the component of the light beam 8 which has not been modulated by the first partial area 11 and vice versa. The light beam 8 exiting the device 1 according to FIG. 2 thus also has the component having the polarization direction 10 whose wave fronts display the modulation impressed by the partial area 11 and the component with the polarization direction 9 whose wave fronts display the modulation impressed by the partial area 12.

In the device 1 according to FIGS. 1 and 2, the quarter wave plate 4 according to FIG. 1 and the half wave plate 17 according to FIG. 2 may be chromatic to such an extent that they cause no rotation of the polarization direction 10 of a third component of the respective light beam 8 which, with the incident light beam, has the polarization direction 10 but another wavelength than the first and second components. Then, the wavefronts of this third component of the light beam 8 are neither modulated by the first partial area 11 nor by the second partial area 12 of the spatial light modulator 2.

Figure 3:
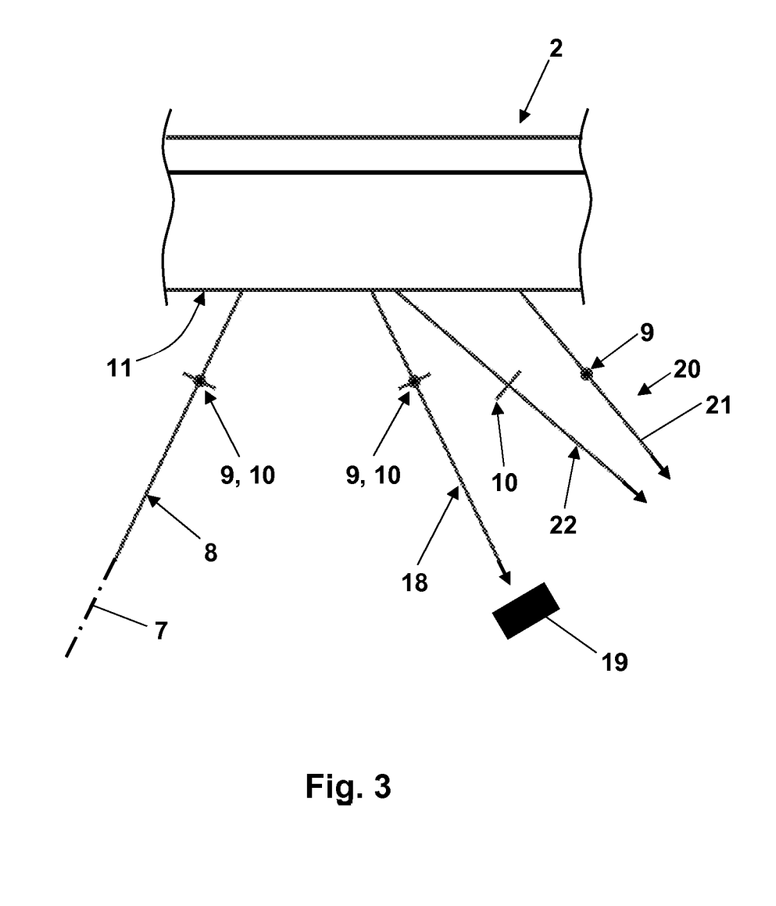
FIG. 3 shows a detail of the device according to FIG. 1 or FIG. 2.

FIG. 3 illustrates a detail of FIG. 1 or 2. The incident light beam 8 is thrown backwards by the partial area 11 of the spatial light modulator 2 in several directions. Particularly, the light beam 8 is diffracted by the spatial light modulator 2. The part of the light beam reflected as a zero order beam 18 is blocked by an optical stop 19, because even the component of this beam 18 having the polarization direction 9, i.e. the first polarization direction of the spatial light modulator 2, does not comprise the desired wave front modulation. Use is made of a first order diffracted beam 20. In this diffracted beam 20, the first component 21 having the polarization direction 9 corresponding to the first polarization direction of the spatial light modulator 2, and the second component 22 having the polarization direction 10, whose wave fronts are not modulated by the spatial light modulator 2 in the partial area 11, have slightly different directions. In other words, the first component 21 is slightly deflected with regard to the second component 22. When the beam 20 with the components 21 and 22, after rotating their polarization directions by 90°, impinges on the second partial area 12 of the spatial light modulator 2, the second component 22 is in a same way deflected with regard to the first component 21. Nevertheless, a small lateral offset remains between the parallel bundles of rays of the components 21 and 22 at the exit of the device 1. This lateral offset may result in that the modulations impressed in the wave fronts of the two components, after passing an objective focusing both components, do not result in desired spatial light intensity distributions of the two components in the focus of the objective, because the center of at least one of the two components is not exactly aligned with the optical axis of the objective. It has, however, been found that the lateral offset between the two components or with regard to the optical axis of the objective can be compensated for by means of modifying the modulation patterns which are impressed in the wave fronts of the two components by the partial areas 11 and 12 of the spatial light modulator 2. If, for example, a modulation pattern for a donut-shaped intensity distribution normally corresponds to a so-called phase clock rotating about the optical axis, the center of the phase clock may be shifted and/or the pitch of the phase shift over the circumference of the center may be modified to achieve a symmetric donut-shaped intensity distribution around the focus point of the objective.

Figure 4:
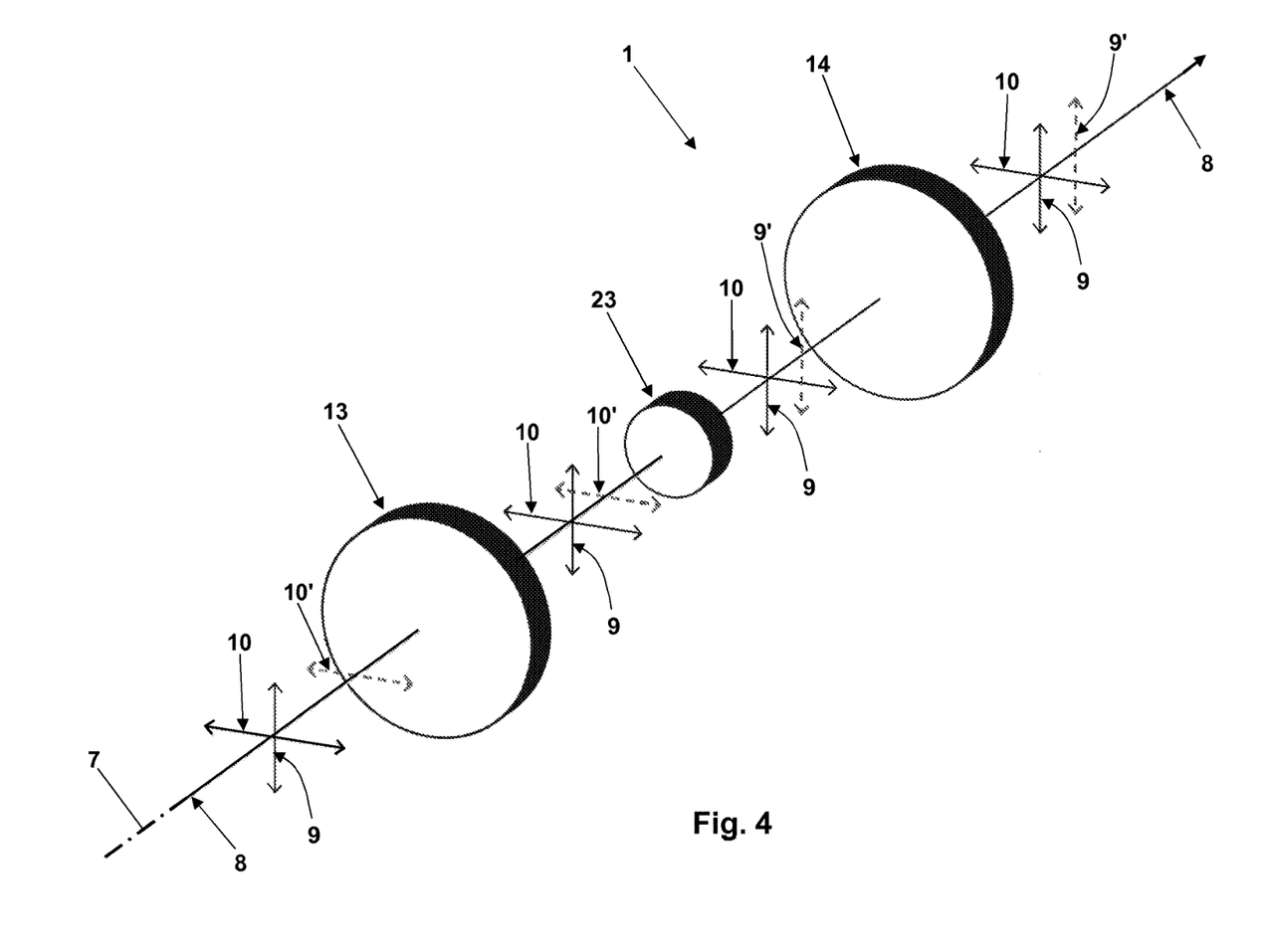
FIG. 4 schematically shows a further embodiment of device for separately modulating the wave fronts of two components of a collimated light beam, the two components being transversally polarized in two orthogonal directions.

The device 1 depicted in FIG. 4 comprises two polarization-selective optical elements 13 and 14 arranged in series in a fixed direction with a half wave plate 23 arranged in between. The optical axis 7 or beam path of the light beam 8 thus has no bend due to a reflection or diffraction. The beam path 8 comprises three components, the first component having the polarization direction 9, the second component having the polarization direction 10 and the further component having the polarization direction 10' which is equal to the second polarization direction 10, but another wavelength than the first and the second components of the light beam 8. By the first polarization-selective optical element 13 made of a birefringent material, a phase pattern is selectively impressed in the wave fronts of the component of the light beam 8 having the polarization direction 9, i.e. the wave fronts of this component are selectively modulated. Here, the phase or modulation pattern is fixedly defined by the optical element 13. After the first optical element 13, the component having the polarization direction 9 already displays the desired modulation of its wave fronts. The chromatic half wave plate 23 now selectively rotates the polarization direction 10' of the further component by 90° into the polarization direction 9', whereas the polarization directions 9 and 10 of the first and the second components remain unchanged. As a consequence, the second optical element 14 modulating the wave fronts of the second component of the light beam 8 with the unchanged polarization direction 10 has no effect on the further component with the rotated polarization direction 9'. Thus, in the light beam 8 exiting the device 1, the first component having the polarization direction 9 displays the wave fronts modulated by the first optical element 13, the second component having the polarization direction 10 displays the wave fronts modulated by the second optical element 14, and the further component having the rotated polarization direction 9' has unmodulated wave fronts.

The chromatic half wave plate 23 in the device 1 according to FIG. 4 may be replaced by a chromatic half wave plate 17 according to FIG. 2 which selectively rotates the polarization directions 9 and 10 of the first and second components of the light beam 8 by 90° but which does not rotate the polarization direction of the third component. Then, the second optical element 14 would have to be rotated by 90° about the optical axis 7 so that it selectively acts upon the wave fronts of the second component. At the end, the three components of the light beam 8 exiting the device 1 would have the same modulations of their wave fronts but polarization directions rotated by 90° as compared to the presentation in FIG. 4.

In FIG. 4, the optical elements 13 and 14 as well as the half wave plate 23 are only depicted as separate parts to indicate the polarization directions in between. A practical embodiment of the device 1 according to FIG. 4 may comprise the optical elements 13 and 14 and the half wave plate 23 arranged in between as a fixed, i.e. monolithic unit in which the optical elements 13 and 14 and the half wave plate 23 are cemented together by means of an optical cement. If the device 1 according to FIG. 4 is provided for a light beam 8 having the first and second component only, there is no need for the half wave plate 23. In this case, the optical elements 13 and 14 may directly follow to each other and they may directly be connected or cemented to each other.

Figure 5:
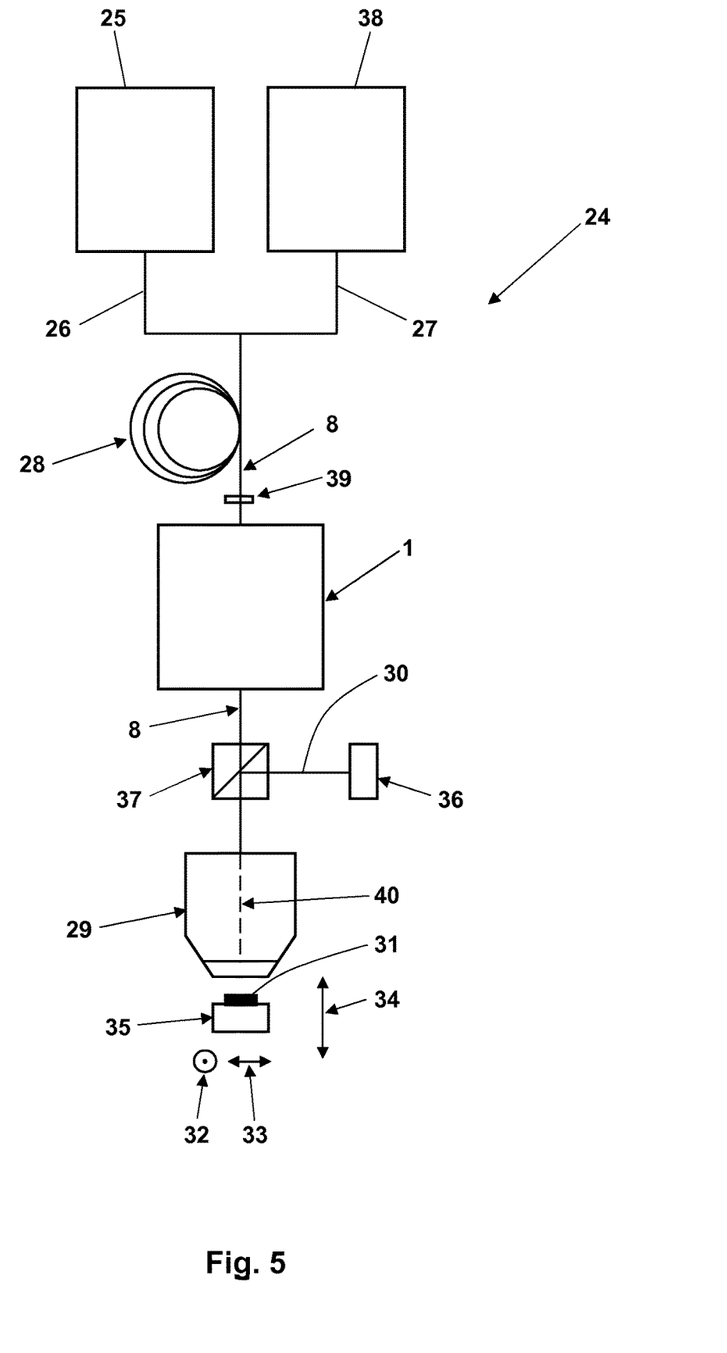
FIG. 5 schematically shows a scanning fluorescence microscope comprising a device for separately modulating the wave fronts of two components of a collimated light beam, the two components being transversally polarized in two orthogonal directions, and the collimated light beam also comprising a third component.

All embodiments of the device 1 for a light beam 8 including three components described up to now may be used in a scanning fluorescence microscope 24 depicted in FIG. 5. The scanning fluorescence microscope 24 has a first light source 25 for excitation light 26 and a second light source 38 for fluorescence inhibiting light 27. Both light sources 25 and 38 are pulsed light sources, particularly pulsed lasers. The excitation light 26 and the fluorescence inhibiting light 27 are together coupled into a birefringent light guide fiber 28. The light guide fiber 28 delays one component of the fluorescence inhibiting light 27 having one transversal polarization direction with regard to the other component of the fluorescence inhibiting light having the other transversal polarization direction by more than a coherence length of the fluorescence inhibiting light 27. The excitation light 26 only has one transversal polarization direction. The excitation light 26 is the further component of the light beam 8, whereas the two differently polarized components of the fluorescence inhibiting light 27 are the first component and the second component of the light beam 8. By means of the device 1, the wave fronts of the two components of the fluorescence inhibiting light 27 are modulated in such a way that the maxima of the light intensity distributions of the fluorescence inhibiting light 27 resulting in the focus of a following objective 29 delimit a zero point or minimum of the light intensity distribution of the fluorescence inhibiting light 27 in x- and y-directions perpendicular to the optical axis 40 of the objective 29, on the one hand, and in z-direction of the optical axis 40, on the other hand. The excitation light, however, has its intensity maximum at the focus point of the objective 29. Thus, fluorescence light emitted out of the sample 31 may thus only origin from a narrow spatially limited area around the focus point of the objective 29 in which fluorophores in the sample 31 are excited for fluorescence but in which fluorescence is not inhibited by the fluorescence inhibiting light 27. By means of the superimposed intensity distributions of the focused excitation light 26 and fluorescence inhibiting light 27, i.e. with the zero point or minimum of the fluorescence inhibiting light 27, the sample 31 is scanned in all three spatial directions as indicated in FIG. 5 by symbols 32 to 34. A movable sample holder 35 and/or a scanner for the light beam 8 (not depicted here) will be provided for this purpose. The fluorescence light 30 is determined for each position of the zero point or minimum of the intensity distribution of the fluorescence inhibiting light in the sample 31 by means of a detector 36 towards which the fluorescence light 30 is deflected away from the optical axis 7 by means of a dichroitic mirror 37. A quarter wave plate 39 arranged between the device 1 and the objective 29 circularly polarizes all components of the light beam 8. This is a measure to enhance the desired light intensity distribution of the fluorescence inhibiting light created by means of destructive and constructive interference in the focus of the objective 29.

Many variations and modifications may be made to the preferred embodiments of the invention without departing substantially from the spirit and principles of the invention. All such modifications and variations are intended to be included herein within the scope of the present invention, as defined by the following claims.

We claim:

1. A device for separately modulating wave fronts of a first component and a second component of a collimated light beam, the first component and the second component being transversally polarized in a first direction and in a second direction orthogonal to the first direction, respectively, the device comprising:
   a first polarization-selective optical element configured to selectively modulate the wave fronts of the first component; and
   a second polarization-selective optical element configured to selectively modulate the wave fronts of the second component, the second polarization-selective optical element being arranged behind the first polarization-selective optical element in a beam path of the collimated light beam;
   wherein the first and second polarization-selective optical elements are first and second partial areas of one spatial light modulator, the first and second partial areas both diffracting the light beam in a backward direction;
   at least one mirror arranged in the beam path of the light beam between the first and the second partial areas of the spatial light modulator to reflect the light beam coming from the first partial area towards the second partial area; and
   a wave plate configured and arranged in the beam path of the light beam between the first partial area and the second partial area of the spatial light modulator to rotate the polarization directions of both components of the light beam by 90°;
   wherein the at least one mirror is configured and arranged to both reflect the first component and the second component of the light beam as parallel bundles of light rays resulting in a lateral offset between the first component and the second component of the light beam in the beam path of the light beam behind the second partial area of the spatial light modulator.

2. The device of claim 1, wherein the at least one mirror consists of a single mirror arranged in the beam path of the light beam between the first and the second partial areas of the spatial light modulator, and wherein the wave plate consists of one quarter wave plate arranged in the beam path of the light beam both between the first partial area and the mirror and between the mirror and the second partial area of the spatial light modulator.

3. The device of claim 2, wherein the single mirror comprises a reflective coating on a transparent substrate, wherein the beam path of the light beam at least in front of the first partial area or behind the second partial area of the spatial light modulator passes through uncoated areas of the transparent substrate.

4. The device of claim 3, wherein the single mirror comprises the reflective coating on a surface of the transparent substrate facing the spatial light modulator.

5. The device of claim 3, wherein the one quarter wave plate is supported at the transparent substrate.

6. The device of claim 2, wherein the single mirror comprises a reflective coating on a surface of the one quarter wave plate facing away from the spatial light modulator, the quarter wave plate being arranged on a transparent substrate, wherein the beam path of the light beam at least in front of the first partial area or behind the second partial area of the spatial light modulator passes through uncoated areas of the transparent substrate.

7. The device of claim 1, wherein the wave plate is chromatic such that the waveplate does not rotate a polarization direction of a further component of the light beam, which light beam has a same transverse polarization direction as the first component and another wavelength than the first component and the second component of the light beam.

8. The device of claim 2, wherein the quarter wave plate is chromatic such that the waveplate does not rotate a polarization direction of a further component of the light beam, which light beam has a same transverse polarization direction as the first component and another wavelength than the first component and the second component of the light beam.

9. A method of using a device for separately modulating wave fronts of a first component and a second component of a collimated light beam, the first component and the second component being transversally polarized in a first direction and in a second direction orthogonal to the first direction, respectively, the device comprising:
  a first polarization-selective optical element configured to selectively modulate the wave fronts of the first component; and
  a second polarization-selective optical element configured to selectively modulate the wave fronts of the second component, the second polarization-selective optical element being arranged behind the first polarization-selective optical element in a beam path of the collimated light beam;
  wherein the first and second polarization-selective optical elements are first and second partial areas of one spatial light modulator, the first and second partial areas both diffracting the light beam in a backward direction;
  at least one mirror arranged in the beam path of the light beam between the first and the second partial areas of the spatial light modulator to reflect the light beam coming from the first partial area towards the second partial area; and
  a wave plate configured and arranged in the beam path of the light beam between the first partial area and the second partial areas of the spatial light modulator to rotate the polarization directions of both components of the light beam by 90°;
  wherein the at least one mirror is configured and arranged to both reflect the first component and the second component of the light beam as parallel bundles of light rays resulting in a lateral offset between the first component and the second component of the light beam in the beam path of the light beam behind the second partial area of the spatial light modulator;
the method comprising:
  operating the spatial light modulator in its first and second spatial areas for impressing first and second modulation patters in the wave fronts of the first and second components of the light beam, respectively; and
  modifying at least one of the first and second modulation patterns to compensate for the lateral offset between the first component and the second component of the light beam in the beam path of the light beam behind the second partial area of the spatial light modulator.

10. A scanning fluorescence microscope comprising:
  an excitation light source configured to provide excitation light,
  a fluorescence inhibiting light source configured to provide fluorescence inhibiting light as a first component and a second component of a collimated light beam, the first component and the second component being transversally polarized in a first direction and in a second direction orthogonal to the first direction, respectively,
  a common objective configured to focus both the excitation light and the fluorescence inhibiting light, and
  a device arranged in a beam path of the collimated light beam, the device comprising:
  a first polarization-selective optical element configured to selectively modulate the wave fronts of the first component; and
  a second polarization-selective optical element configured to selectively modulate the wave fronts of the second component, the second polarization-selective optical element being arranged behind the first polarization-selective optical element in a beam path of the collimated light beam;
  wherein the first and second polarization-selective optical elements are first and second partial areas of one spatial light modulator, the first and second partial areas both diffracting the light beam in a backward direction;
  at least one mirror arranged in the beam path of the light beam between the first and the second partial areas of the spatial light modulator to reflect the light beam coming from the first partial area towards the second partial area; and
  a wave plate configured and arranged in the beam path of the light beam between the first partial area and the second partial areas of the spatial light modulator to rotate the polarization directions of both components of the light beam by 90°;
  wherein the at least one mirror is configured and arranged to both reflect the first component and the second component of the light beam as parallel bundles of light rays resulting in a lateral offset between the first component and the second component of the light beam in the beam path of the light beam behind the second partial area of the spatial light modulator.

11. The scanning fluorescence microscope of claim 10, wherein the at least one mirror consists of a single mirror arranged in the beam path of the light beam between the first and the second partial areas of the spatial light modulator, and wherein the wave plate consists of one quarter wave plate arranged in the beam path of the light beam both between the first partial area and the mirror and between the mirror and the second partial areas of the spatial light modulator.

12. The scanning fluorescence microscope of claim 10, wherein the excitation light source is configured to provide the excitation light as a further component of the light beam, which has a same transverse polarization direction as the first component and another wavelength than the first component and the second component; and wherein the quarter wave plate is chromatic such that the waveplate is not effective as a wave plate for the further component of the light beam.

13. The scanning fluorescence microscope of claim 12, wherein the at least one mirror consists of a single mirror arranged in the beam path of the light beam between the first and the second partial areas of the spatial light modulator, and wherein the wave plate consists of one quarter wave plate arranged in the beam path of the light beam both between the first partial area and the mirror and between the mirror and the second partial area of the spatial light modulator.

14. The scanning fluorescence microscope of claim 10, wherein a birefringent optical element is arranged between the fluorescence inhibiting light source and the device, the birefringent optical element being configured to delay one of the first and second components of the light beam with regard to the other of the first and second components of the light beam by more than a coherence length of the fluorescence inhibiting light.

15. The scanning fluorescence microscope of claim 14, wherein a further quarter wave plate is arranged in the beam path of the light beam between the device and the common objective.

16. The scanning fluorescence microscope of claim 14, wherein the birefringent optical element is a birefringent light guide fiber.

* * * * *